United States Patent
Askar

(10) Patent No.: US 10,291,477 B1
(45) Date of Patent: May 14, 2019

(54) INTERNET OF THINGS (IOT) DEVICE REGISTRATION

(71) Applicant: Amazon Technologies, Inc., Seattle, WA (US)

(72) Inventor: Allan Askar, Washington, DC (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 15/174,895

(22) Filed: Jun. 6, 2016

(51) Int. Cl.
*H04L 12/00* (2006.01)
*G06F 13/00* (2006.01)
*H04L 12/24* (2006.01)
*H04L 29/08* (2006.01)
*H04L 29/06* (2006.01)

(52) U.S. Cl.
CPC .......... *H04L 41/12* (2013.01); *H04L 41/0809* (2013.01); *H04L 63/126* (2013.01); *H04L 67/12* (2013.01)

(58) Field of Classification Search
CPC .... H01Q 1/22; H01Q 1/2291; H04L 12/2827; H04L 67/025; H04L 67/12; H04L 67/28; H04L 2012/2841; H04L 2012/284
USPC ................................................. 709/223, 224
See application file for complete search history.

(56) References Cited

U.S. PATENT DOCUMENTS

| | | | | |
|---|---|---|---|---|
| 6,059,583 A * | 5/2000 | Croft | ...................... | H01R 35/02 439/131 |
| 6,171,123 B1 * | 1/2001 | Chang | ................ | H01R 13/7031 439/188 |
| 6,564,056 B1 * | 5/2003 | Fitzgerald | ............ | H04L 12/2803 340/5.1 |
| 7,603,139 B1 * | 10/2009 | Tom | ..................... | H04M 1/0254 455/550.1 |
| 8,629,813 B2 * | 1/2014 | Milosavljevic | ........ | H01Q 1/243 343/850 |
| 8,655,307 B1 * | 2/2014 | Walker | .............. | H04W 52/0212 455/405 |
| 9,847,569 B2 * | 12/2017 | Zakaria | .................... | H01Q 1/22 |
| 2001/0025349 A1 * | 9/2001 | Sharood | ............. | G06Q 30/0235 713/340 |
| 2003/0210199 A1 * | 11/2003 | Sward | ...................... | H01Q 1/10 343/795 |
| 2004/0093424 A1 * | 5/2004 | Kojima | ............... | H04L 12/4641 709/232 |
| 2008/0136716 A1 * | 6/2008 | Annamaa | .................. | H01Q 1/22 343/702 |
| 2011/0260939 A1 * | 10/2011 | Korva | .................... | H01Q 1/243 343/725 |
| 2012/0207481 A1 * | 8/2012 | Elberbaum | ............ | G08C 23/06 398/113 |

(Continued)

*Primary Examiner* — Frantz Coby
(74) *Attorney, Agent, or Firm* — Thorpe North & Western, LLP

(57) ABSTRACT

Technology is described for registering Internet of Things (IoT) devices. A hub device may receive a request for hub registration from an IoT device. The request for hub registration may include IoT device information. The hub device may validate the request for hub registration at the hub device based on the IoT device information. The hub device may retrieve registration information from an IoT service. The registration information may include a dedicated security certificate for the IoT device. The hub device may forward the registration information to the IoT device to enable the IoT device to communicate IoT device data to the IoT service.

20 Claims, 8 Drawing Sheets

(56) References Cited

U.S. PATENT DOCUMENTS

| | | | | |
|---|---|---|---|---|
| 2014/0292533 | A1* | 10/2014 | Kamel | H02J 13/0006 |
| | | | | 340/870.02 |
| 2015/0071052 | A1* | 3/2015 | Hershberg | H04W 24/04 |
| | | | | 370/216 |
| 2016/0066148 | A1* | 3/2016 | Schwartz | H04W 52/283 |
| | | | | 455/456.1 |
| 2016/0195859 | A1* | 7/2016 | Britt | H04W 4/80 |
| | | | | 700/275 |
| 2016/0197772 | A1* | 7/2016 | Britt | H04W 4/70 |
| | | | | 370/254 |
| 2016/0198536 | A1* | 7/2016 | Britt | H05B 37/0272 |
| | | | | 315/149 |
| 2016/0323257 | A1* | 11/2016 | Kang | H04L 63/08 |
| 2016/0353305 | A1* | 12/2016 | Zakaria | H04M 1/72519 |
| 2017/0005390 | A1* | 1/2017 | Zakaria | H01Q 1/22 |
| 2017/0005820 | A1* | 1/2017 | Zimmerman | H04L 67/10 |
| 2017/0006595 | A1* | 1/2017 | Zakaria | H04L 67/12 |
| 2017/0085005 | A1* | 3/2017 | Aue | H04B 1/40 |
| 2017/0201585 | A1* | 7/2017 | Doraiswamy | H04L 41/0806 |

* cited by examiner

INTERNET OF THINGS (IOT) DEVICE REGISTRATION

BACKGROUND

The Internet of Things (IoT) is the interconnection of computing devices scattered across the globe using the existing Internet infrastructure. IoT devices may be assigned a unique identifier, such as an Internet Protocol version 6 (IPv6) address, an IPv4 address, a uniform resource identifier (URI), or a global unique identifier. IoT devices may be able to capture IoT device data, and then the IoT devices may securely communicate the IoT device data over a network to a centralized IoT service in a service provider environment. The IoT devices may register with the IoT service prior to communicating the IoT device data to the IoT service. In one example, the IoT service may perform various analytics on the IoT device data. For example, the IoT service may analyze streaming IoT device data and trigger alerts based on the analysis of the streaming IoT device data.

IoT devices may be embedded in a variety of physical devices or products, such as industrial equipment, farm machinery, home appliances, manufacturing devices, industrial printers, automobiles, thermostats, smart traffic lights, vehicles, buildings, etc. These physical devices may have embedded electronics, software, sensors, and network connectivity that enables these physical devices to collect and exchange data. IoT may be useful for a number of applications, such as environmental monitoring, farming, infrastructure management, industrial applications, building and home automation, energy management, medical and healthcare systems, transport systems, etc.

DETAILED DESCRIPTION

Figure 1:
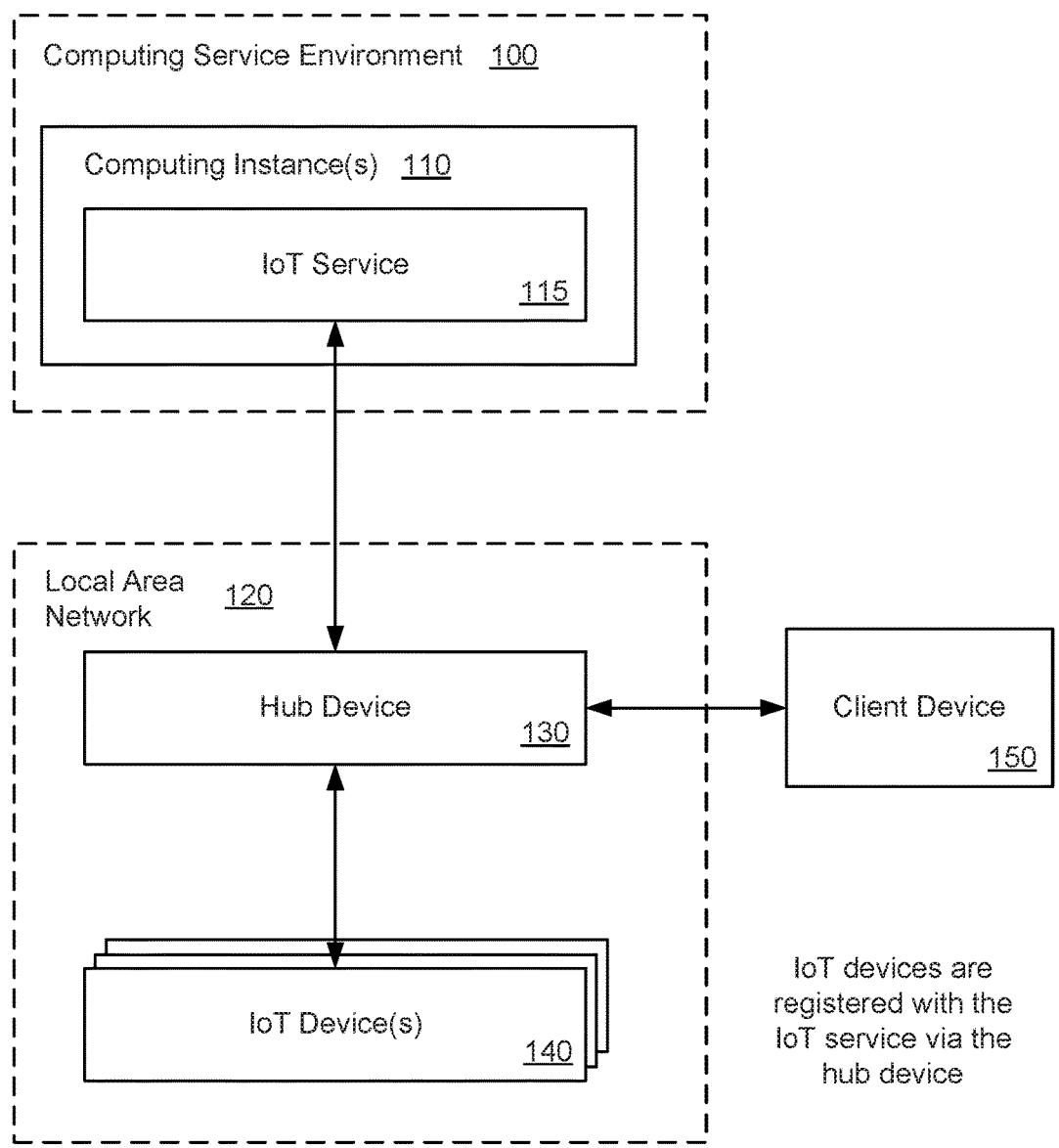
FIG. 1 illustrates a system and related operations for registering Internet of Things (IoT) devices with an IoT service via a hub device according to an example of the present technology.

A technology is described for registering Internet of Things (IoT) devices with an IoT service via a hub device. The IoT devices may be in a local area network with the hub device. The IoT service may operate on one or more computing instances in a computing service environment. The hub device may assist in various administration tasks for the IoT devices, such as secure service registration for the IoT devices and firmware updates for the IoT devices. In other words, the hub device may act as an intermediary between the IoT devices and the IoT service when assisting in service registration and firmware updates. Thus, the hub device may have greater computing power and memory to store and execute infrequently used code and functions for the administrative functions of the IoT devices. The hub device may perform administrative functions for the IoT devices and then pass the results to the IoT devices. This means that IoT devices with more limited computing power and memory may be able to have expanded functionality by using the hub device.

In one example, the hub device may be configured to perform IoT device service registration. The hub device may receive a service registration configuration from a client device. A user may define, via an interface on the client device, the service registration configuration to be implemented on the hub device. The service registration configuration may include: security credentials for the hub device to use when registering the IoT devices with the IoT service, wireless access point information for the hub device to connect to the IoT service, an identity of the IoT service (or application) to provision for the IoT devices, and wireless access point information for the IoT devices to connect to the IoT service. In addition, the service registration configuration may include a plurality of IoT device part numbers and IoT device serial numbers corresponding with IoT devices to be registered with the IoT service.

The IoT device of the example above may be preconfigured with hub connection information. The hub connection information may include a service set identifier (SSID) associated with the hub device and instructions to connect to the hub device after the IoT device is powered on. Therefore, when the IoT device is initially powered on, the IoT device may be configured to search for the hub device and establish a connection between the IoT device and the hub device based on the hub connection information. After the connection is established, the hub device may receive a request for hub registration from the IoT device. The request for hub registration may include IoT device information. The IoT device information may include an IoT service or application identifier, a type of IoT device, an IoT device part number, and an IoT device serial number. The hub device may validate the request for hub registration when the IoT device information included in the request corresponds to the service registration configuration received from the client device. The hub device may provide a security token to the IoT device after the request for hub registration is validated at the hub device.

Further, the hub device may communicate with the IoT service using registration application program interface (API) functions on the hub device to create one or more IoT objects for the IoT device in the IoT service and retrieve registration information on behalf of the IoT device. The IoT objects may include policy objects, shadow objects, IoT "thing" objects and certificate objects. The registration information may include a dedicated security certificate for the IoT device, as well as additional configuration data that enables the IoT device to establish a connection with the IoT service. The hub device may store the registration information for each IoT device. At a later time, the hub device may receive a request for service registration from the IoT device, and the request for service registration may include the security token previously provided to the IoT device. The hub device may verify that the registration information (e.g., dedicated security certificate) for the IoT device was received from the IoT service. The hub device may determine that the security token included in the request for service registration corresponds to the security token that was previously communicated from the hub device to the IoT device, and in response, the hub device may authenticate the IoT device and forward the registration information to the IoT device. The registration information may enable the IoT device to connect to the IoT service and communicate IoT device data to the IoT service.

In one configuration that is similar to the registration scenario previously described, the hub device may periodically receive firmware updates or software updates from the IoT service. The hub device may provide the firmware updates or software updates to the IoT devices via a local area network (LAN) connection. The IoT devices may be configured to install the firmware updates or software updates.

FIG. 1 illustrates an exemplary system and related operations for registering Internet of Things (IoT) devices 140 with an IoT service 115 via a hub device 130. The IoT service 115 may execute on a computing instance 110 in a computing service environment 100. The hub device 130 may be a dedicated hardware device for communicating with the IoT service 115 and facilitating service registration for the IoT devices 140 with the IoT service 115. The hub device 130 may also perform other tasks such as data aggregation and device state management. The hub device 130 may have increased processing capabilities as compared to the IoT devices 140, such that the hub device 130 may be capable of registering hundreds or thousands of IoT devices 140 in a limited time duration. The hub device 130 and the IoT devices 140 may be in a local area network 120. The local area network may span a relatively small area, such as a single building or a group of buildings. As a non-limiting example, the local area network may span a diameter of 300 meters. The hub device 130 and the IoT devices 140 may communicate within the local area network 120 using an appropriate wired or wireless standard, such as WiFi. The hub device 130 may be configured to perform service registration using information received from a client device 150. Specifically, the client device 150 may provide a service registration configuration to the hub device 130, and the hub device 130 may perform service registration for the IoT devices 140 in accordance with the service registration configuration.

In one example, the hub device 130 may receive a request for hub registration from an IoT device 140 that is in the local area network with the hub device 130. The request for hub registration may include IoT device information. The hub device 130 may compare the IoT device information with the service registration configuration received from the client device 150, and the hub device 130 may validate the request for hub registration when the IoT device information corresponds to the service registration configuration.

The hub device 130 may communicate with the IoT service 115 using registration application program interface (API) functions on the hub device 130 in order to create an IoT object (e.g., a shadow object) for the IoT device 140 in the IoT service 115 and retrieve registration information on behalf of the IoT device 140. The IoT object may be a document, such as a JavaScript Object Notation (JSON) document, used to store and retrieve current state information for the IoT device 140. The IoT object may be created for each IoT device 140 that connects to the IoT service 115. The IoT object may store the state of the IoT device 140 regardless of whether the IoT device 140 is connected to the Internet. The registration information may include a dedicated security certificate for the IoT device 140. The hub device 130 may forward the registration information to the IoT device 140. The registration information may enable the IoT device 140 to securely connect to the IoT service 115. After the connection is established between the IoT device 140 and the IoT service 115, the IoT device 140 may communicate IoT device data to the IoT service 115. The IoT device 140 may communicate the IoT device data directly to the IoT service 115 over a computer network (e.g., the internet) or via the hub device 130 and a computer network.

In one example, the hub device 130 may perform service registration for hundreds or thousands of IoT devices 140 within the local area network. For example, the hub device 130 and the IoT devices 140 may be utilized in a factory. The IoT devices 140 may include sensors, actuators, motors, power stations, robotic devices, etc. The IoT devices 140 may establish a connection with an IoT service 115, such as an application for managing the environment in the factory, and then the IoT devices 140 may periodically upload IoT device data (e.g., temperature data, humidity data, and air flow data) to the IoT service 115. Rather than having each of the IoT devices 140 directly establishing a connection with the IoT service 115 for registration and other similar computing intensive services (which results in a relatively high amount of processing and signaling overhead for the IoT devices 140), the hub device 130 may act as an intermediary to perform the service registration for the IoT devices 140. As an intermediary, the hub device 130 may function to create new IoT objects (e.g., shadow objects) and retrieve dedicated security certificates corresponding to the hundreds or thousands of IoT devices 140. The hub device 130 may provide the dedicated security certificates to the IoT devices 140, and then the IoT devices 140 may establish individual connections to the IoT service 115 using the dedicated security certificates. As a result, the amount of processing and signaling overhead may be reduced at the IoT devices 140. In one example, the hub device 130 may be configured to only perform service registration for IoT devices 140. Alternatively, the hub device 130 may be configured to perform various functions in addition to service registration, such as data aggregation and device state management.

Figure 2:
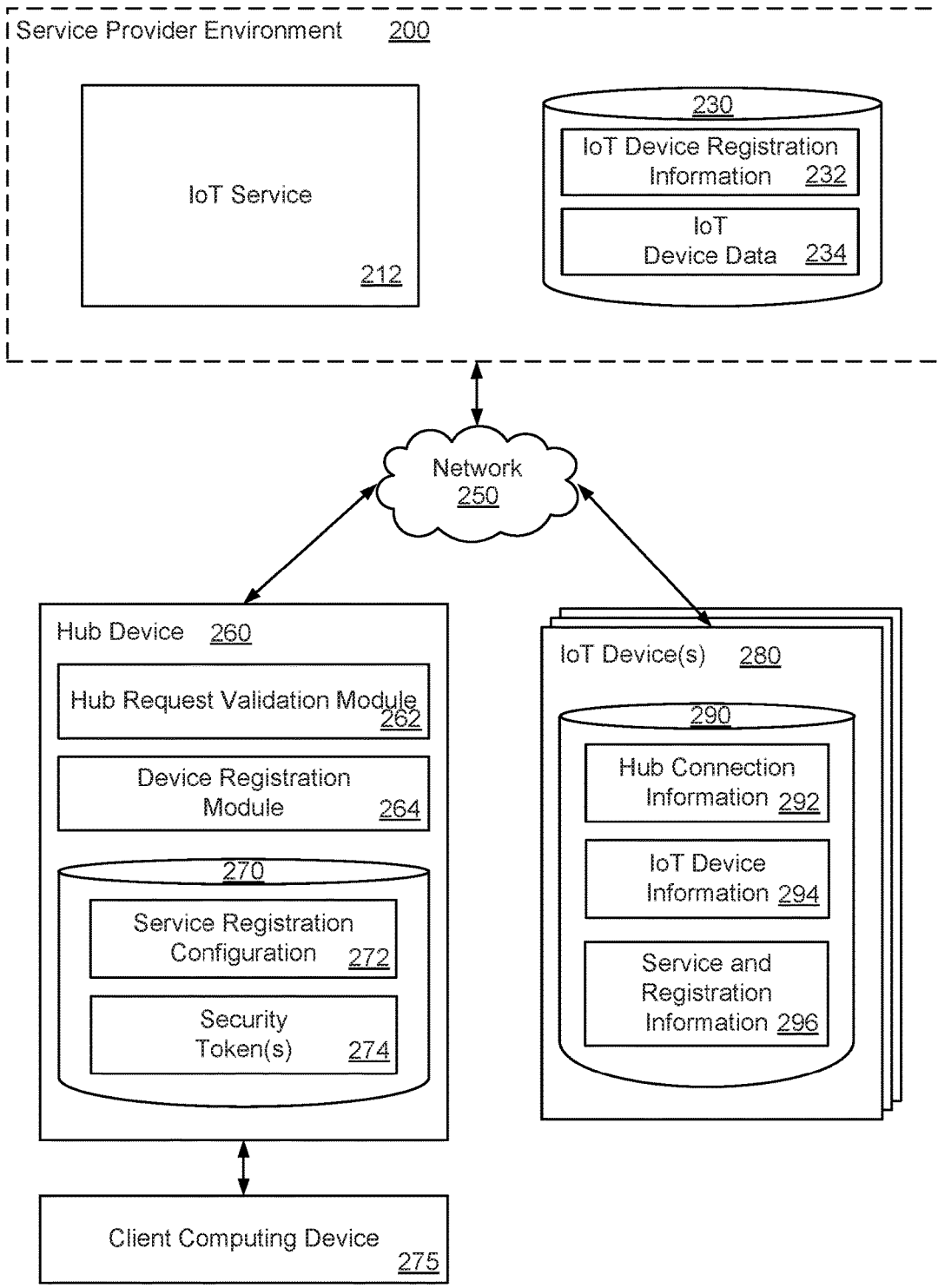
FIG. 2 is an illustration of a networked system for registering Internet of Things (IoT) devices according to an example of the present technology.

FIG. 2 illustrates components of an example service provider environment 200 according to one example of the present technology. The service provider environment 200 may operate an Internet of Things (IoT) service 212. The IoT service 212 may communicate with a plurality of IoT devices 280. For example, the IoT service 212 may receive IoT device data 234 from the IoT devices 280, and the IoT service 212 may perform analytics, device shadowing, reporting, or other types of processing on the IoT device data 234. The IoT service 212 may be in communication with a hub device 260. The hub device 260 may include a number of modules for registering the IoT devices 280 with the IoT service 212, as will be described later. The hub device 260 may be configured using a client computing device 275. In other words, the client computing device 275 may configure the hub device 260 to perform the service registration for the IoT devices 280. The IoT service 212, the hub device 260 and the IoT devices 280 may be associated with first, second and third data stores 230, 270, 290, respectively. The service provider environment 200 (that operates the IoT service 212) may be in communication with the hub device 260 and the IoT devices 280 via a network 250.

The data stored in the data store 220 may include IoT device registration information 232. The IoT device registration information 232 may include registration information that enables the IoT devices 280 to establish connections with the IoT service 212. The IoT device registration information 232 may include a plurality of security certificates for the IoT devices 280. As an example, the security certificates may be X.509 certificates or another type of security certificate or token. The IoT device registration information 232 may include additional configuration data that enables the IoT devices 280 to establish the connections with the IoT service 212. For example, the additional configuration data may include wireless access point information for the IoT devices 280 to connect to the IoT service 212.

The data stored in the data store 230 in the service provider environment 200 may include IoT device data 234. The IoT device data 234 may include sensor data, data generated at the device from analysis, data aggregated at the device, device state data, etc. The IoT device data 234 may be defined using a JavaScript Object Notation (JSON) format, but payloads in the IoT device data 234 may not be limited to the JSON format and may use any other formats as desired (e.g., XML (extensible markup language), comma delimited files, flat files, binary files, etc.). The IoT device data 234 may be periodically received from the IoT devices 260 as a data stream. For example, the IoT device data 234 may be received every minute, every hour, twice a day, once a day, once a week, etc. from a particular IoT device 280. The IoT device data 234 may relate to a wide variety of information including, but not limited to, temperature, humidity, velocity, acceleration, light, sound, device state, global positioning system (GPS) coordinates, etc. Each transmission of the IoT device data 234 may be a size ranging from several bytes to several hundred kilobytes, but the size of each IoT device data transmission is not intended to be limited to this range.

The hub device 260 may include a hub request validation module 262, a device registration module 264, and other applications, services, processes, systems, engines, or functionality not discussed in detail herein. The hub request validation module 262 may be configured to validate a request for hub registration received from the IoT device 280. The hub request validation module 262 may validate the request for hub registration when IoT device information 294 included in the request corresponds to a service registration configuration 272 received from the client computing device 275. The hub request validation module 262 may compare the service registration configuration 272 with the IoT device information 294, and when the IoT device information 294 matches the service registration configuration 272, the hub request validation module 262 may determine that the IoT device 280 is eligible for service registration.

The device registration module 264 may be configured to communicate with the IoT service 212 using registration application program interface (API) functions to retrieve the IoT device registration information 232 on behalf of the IoT device 280, and the IoT device registration information 232 may include a dedicated security certificate for the IoT device 280. The device registration module 264 may create an IoT shadow object for the IoT device 280 to be registered with the IoT service 212, such that compute resources in the service provider environment 200 may be allocated for the IoT device 280. The device registration module 264 may forward the IoT device registration information 232 (e.g., the dedicated security certificate) to the IoT device 280, and the IoT device registration information 232 may enable the IoT device 280 to connect to the IoT service 212 and communicate IoT device data 234 to the IoT service 212. In one example, the device registration module 264 may forward the IoT device registration information 232 to the IoT device 280 after a security token 274 is received from the IoT device 280.

The data stored in the data store 270 of the hub device 260 may include a service registration configuration 272. The service registration configuration 272 may be received from the client computing device 275. The service registration configuration 272 may enable the hub device 260 to perform service registrations for the IoT devices 280. The service registration configuration 272 may include: security credentials for the hub device 260 to use when registering the IoT device 280 with the IoT service 212, wireless access point information for the hub device 260 to connect to the IoT service 212, an identity of the IoT service or application to provision for the IoT device 280, and wireless access point information for the IoT device 280 to connect to the IoT service 212. In addition, the service registration configuration 272 may include IoT device part number(s) and IoT device serial number(s) associated with IoT devices 280 to be registered with the IoT service 212.

The data stored in the data store 270 may include security tokens 274. The security tokens 274 may utilize public-key cryptography or asymmetric cryptography. The security tokens 274 may be provided to the IoT devices 280 to assist in the service registration of the IoT devices 280. For example, a security token 274 may be provided to each IoT device 280 (e.g., pre-loaded in the device), and when the IoT device 280 returns the same security token 274 to the hub device 260, the IoT device 280 may be authenticated and the hub device 260 may provide the IoT device registration information 232 to the IoT device 280.

In one configuration, the IoT device 280 may connect to the hub device 260 using hub connection information 292. The IoT device 280 may send a request for hub registration to the hub device 260, and the request for hub registration may include IoT device information 294. The IoT device 280 may receive the security token 274 from the hub device 260 after validation of the request for hub registration. The IoT device 280 may send a request for service registration to the hub device 260, and the request may include the security token 274 previously communicated from the hub device 260 to the IoT device 280. The IoT device 280 may receive the IoT device registration information 232 (e.g., dedicated security certificate) from the hub device 260, and then the IoT device 280 may connect to the IoT service 212 using the IoT device registration information 232.

The data stored in the data store 290 of the IoT device 280 may include the hub connection information 292. The hub connection information 292 may be preconfigured at the IoT device 280, and the hub connection information 292 may be utilized at the IoT device 280 to establish a connection with the hub device 260. The hub connection information 292 may include a service set identifier (SSID) associated with the hub device 260 and instructions to connect to the hub device 260 after the IoT device 280 is powered on.

The data stored in the data store 290 of the IoT device 280 may include IoT device information 294. The IoT device information 294 may be preconfigured for the IoT device 280. The IoT device information 294 may include an IoT service or application identifier. The IoT service or application identifier may indicate a particular IoT service or application for which the IoT device 280 is being registered. The IoT device information 294 may include an identifier for a type of IoT device (e.g., temperature sensor, moisture sensor, traffic sensor). The IoT device information 294 may include an IoT device part number and an IoT device serial number associated with the IoT device 280.

The data stored in the data store 290 of the IoT device 280 may include service and registration information 296. The service and registration information 296 may include the IoT device registration information that enables the IoT device 280 to connect to the IoT service 212. The service and registration information 296 may include security certificates, as well as additional configuration data and/or registration data.

The IoT device 280 may comprise, for example a processor-based system such as a computing system. As non-limiting examples, the IoT device 280 may include consumer products (e.g., rice cookers, printers, or scanners), home automation products (e.g., smart thermostats, smart refrigerators, heating, air conditioning, etc.), manufacturing devices, farming devices, factory devices, industrial metal stamping devices, industrial robots, sensors, drones, or other devices that are assigned unique identifiers and are capable of communicating data over the network 250. Commercial devices may also be included in the definition of the IoT device 280, including: commercial printing presses, commercial freezers, commercial kilns, commercial mixers or other commercial equipment.

The client computing device 275 may comprise a computer system that is embodied in the form of a desktop computer, a laptop computer, mobile devices, cellular telephones, smartphones, set-top boxes, network-enabled televisions, tablet computer systems, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, time series databases, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 250 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
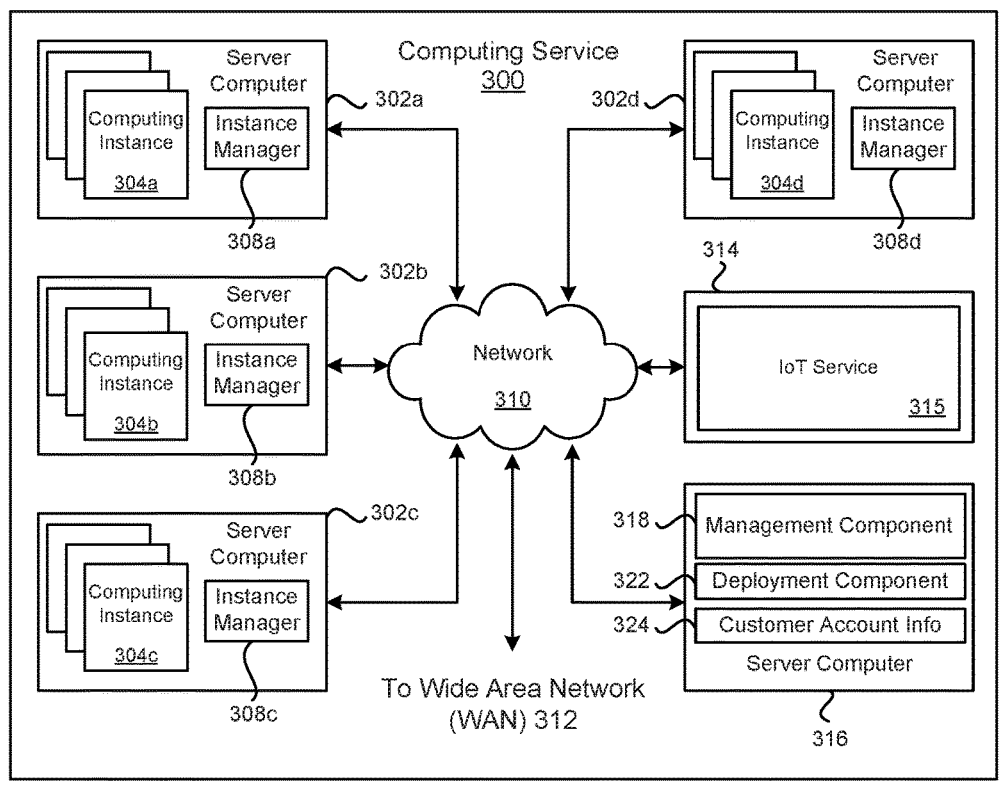
FIG. 3 is a block diagram of a computing service environment according to an example of the present technology.

FIG. 3 is a block diagram illustrating an example computing service 300 that may be used to execute and manage a number of computing instances 304a-d upon which the present technology may execute. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. The server computers 302a-d may also be known as physical hosts. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine manager (VMM), or another type of program configured to enable the execution of multiple computing instances 304a-d on a single server. Additionally, each of the computing instances 304a-d may be configured to execute one or more applications.

A server 314 may be reserved to execute software components for implementing the present technology or managing the operation of the computing service 300 and the computing instances 304a-d. For example, the server computer 314 may execute an Internet of Things (IoT) service 315 operable to provide IoT device registration information (e.g., security certificates) to facilitate a service registration with the IoT service 315. The IoT service 315 may provide the IoT device registration information to a plurality of IoT devices via a hub device. The IoT device registration information may enable the IoT devices to connect to the IoT service 315 and communicate IoT device data to the IoT service 315. The IoT service 315 may perform analytics or other types of processing on the IoT device data. In addition, the IoT service 315 may provide configuration updates and/or software updates or other compute intensive functions to the IoT devices via the hub device.

A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache is to be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. In addition, the network 310 may include a virtual network overlaid on the physical network to provide communications between the servers 302a-d. The network topology illustrated in FIG. 3 has been simplified, as many more networks and networking devices may be utilized to interconnect the various computing systems disclosed herein.

Figure 4:
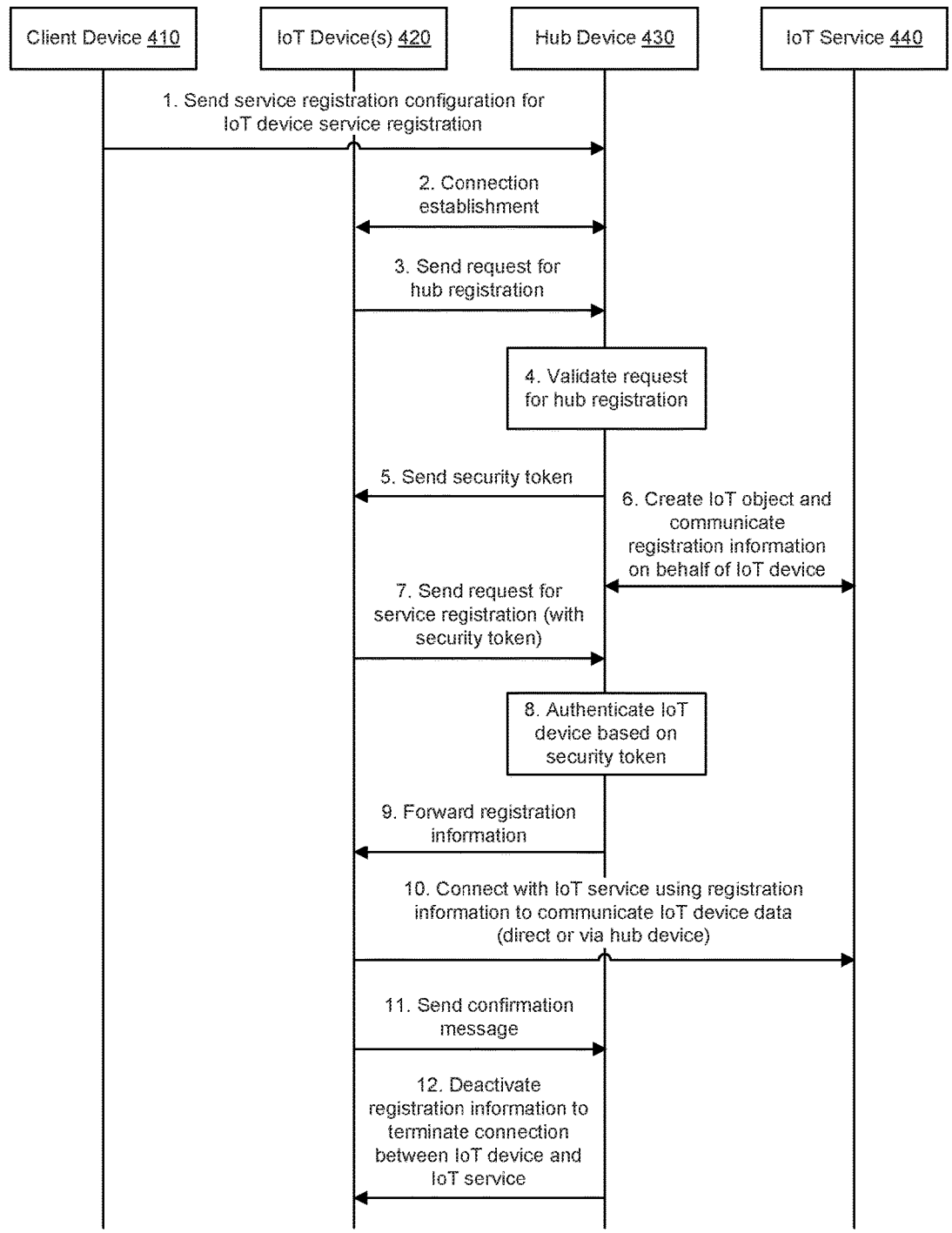
FIG. 4 illustrates operations for registering Internet of Things (IoT) devices with an IoT service via a hub device according to an example of the present technology.

FIG. 4 illustrates exemplary operations for registering Internet of Things (IoT) devices 420 with an IoT service 440 via a hub device 430. The IoT devices 420 may be in a local area network with the hub device 430. The IoT service 440 may operate on one or more computing instances in a computing service environment. The hub device 430 may assist in various administration tasks for the IoT devices 420, such as secure service registration for the IoT devices 420 and firmware updates for the IoT devices 420.

In one example, the hub device 430 and/or the IoT devices 420 may be offered for sale by a seller or manufacturer, and the hub device 430 and/or the IoT devices 420 may be purchased by an operator. The operator may install the hub device 430 and/or the IoT devices 420 in a defined location, such as a factory, warehouse, farm, workshop, etc. When initially installed, the IoT devices 420 may not be registered with the IoT service 440. Therefore, the IoT devices 420 may initially be unable to communicate IoT device data to the IoT service 440.

In one example, a series of operations may be performed to register the IoT devices 420 with the IoT service 440. In step 1, a client device 410 may send a service registration configuration to the hub device 430, and the service registration configuration may enable the hub device 430 to perform IoT device service registration. For example, the operator may provide the service registration configuration via a user interface on the client device 410. Alternatively, the service registration configuration may be preconfigured on the hub device 430. For example, the service registration configuration may be stored on the hub device 430 by the manufacturer, and then the hub device 430 that includes the service registration configuration may be sold to the operator. The service registration configuration may include security credentials for the hub device 430 to use when registering the IoT devices 420 with the IoT service 440, wireless access point information for the hub device 430 to connect to the IoT service 440, the IoT service 440 (or application) to provision for the IoT devices 420, and wireless access point information for the IoT devices 420 to connect to the IoT service 440. In addition, the service registration configuration may include a plurality of IoT device part numbers and IoT device serial numbers corresponding with the IoT devices 420 to be registered with the IoT service 440.

In step 2, an IoT device 420 may establish a local area network (LAN) connection with the hub device 430. The IoT device 420 may be preconfigured with hub connection information. The hub connection information may include a service set identifier (SSID) associated with the hub device 430 and instructions to connect to the hub device 430. When the IoT device 420 is installed and initially powered on, the IoT device 420 may be configured to search for the hub device 430 in the local area network and establish the connection with the hub device 430 using the hub connection information. In this configuration, the IoT device 420 may initially be unable to connect to the IoT service 440 directly, but rather may connect to the hub device 430 for service registration with the IoT service 440. In one example, the hub device 430 may broadcast its SSID, and the IoT device 420 may detect the SSID and connect to the hub device 430 accordingly.

After the connection is established between the IoT device 420 and the hub device 430, subsequent communications between the IoT device 420 and the hub device 430 may be encrypted for security purposes. The communications between the IoT device 420 and the hub device 430 may be encrypted using security keys. The security keys may be derived based on various types of information (e.g., the SSID, IoT device information) known to the IoT device 420 and/or the hub device 430, and both the IoT device 420 and the hub device 430 may utilize the security keys for secure communication between the IoT device 420 and the hub device 430.

In step 3, after the connection is established between the IoT device 420 and the hub device 430, the IoT device 420 may send a request for hub registration to the hub device 430. The request for hub registration may be a RESTful application program interface (API) request, such as a hypertext transfer protocol (HTTP) POST request. The request for hub registration may include IoT device information. The IoT device information may include an IoT service or application identifier for which the IoT device 420 is to be registered, a type of IoT device, an IoT device part number and an IoT device serial number. In other words, the IoT device 420 may request to be registered with the hub device 430, and the IoT device 420 may provide the hub device 430 with various characteristics and/or identifiers associated with the IoT device 420.

In step 4, the hub device 430 may validate the request for hub registration. More specifically, the hub device 430 may compare the IoT device information included in the request with the hub registration configuration received from the client device 410, and when the IoT device information matches the service registration configuration, the hub device 430 may determine that the IoT device 420 is eligible for service registration. For example, the hub device 430 may determine that the part number and serial number associated with the IoT device 420 is included in the service registration configuration, and therefore, the IoT device 420 may be eligible for service registration. In one example, the hub device 430 may determine that the IoT device 420 is not eligible for service registration. In this example, the hub device 430 may provide an error message to the IoT device 420 and/or request an updated service registration configuration (with updated part numbers and serial numbers) from the client device 410.

In step 5, the hub device 430 may provide a security token to the IoT device 420 after the request for hub registration is validated at the hub device 430. The IoT device 420 may provide the security token along with subsequent communications with the hub device 430. In other words, the IoT device 420 may provide the security token for authentication purposes.

In step 6, the hub device 430 may create an IoT shadow object for the IoT device 420. The hub device 430 may create the IoT shadow object within the IoT service 440. Accordingly, compute resources in the computing service environment may be allocated for the IoT device 420. The hub device 430 may create device state information and various policies for the IoT device 420. The hub device 430 may create the IoT shadow object, state information, policies, etc. using the security credentials included in the service registration configuration received from the client device 410. In addition, registration information may be created for the IoT device 420. The registration information may include a dedicated security certificate (e.g., X.509 certificate) for the IoT device 420, as well as additional configuration data that enables the IoT device 420 to establish a connection with the IoT service 440. For example, the additional configuration data may include wireless access point information for the IoT device 420 to connect to the IoT service 440. The hub device 430 may communicate with the IoT service 440 using registration application program interface (API) functions on the hub device 430 to retrieve the registration information on behalf of the IoT device 420. In other words, the hub device 430 may download or receive the registration information for each IoT device 420 from the IoT service 440, and the hub device 430 may locally store the registration information for each IoT device 420.

In step 7, the IoT device 420 may send a request for service registration to the hub device 430. The request for service registration may be a RESTful application program interface (API) request, such as a hypertext transfer protocol (HTTP) GET request. The IoT device 420 may send the request at some point after the IoT device 420 receives the security token from the hub device 430. In addition, the request for service registration may include the security token that was previously received from the hub device 430.

In step 8, the hub device 430 may determine whether the security token included in the request for service registration corresponds to the security token previously provided from the hub device 430 to the IoT device 420 (in step 5). If so, the hub device 430 may authenticate the IoT device 420. In other words, the hub device 430 may authenticate the IoT device 420 based on the security token received from the IoT device 420. The hub device 430 may verify that the IoT shadow object has been created and the registration information (e.g., dedicated security certificate) for the IoT device 440 has been successfully received from the IoT service 440.

In step 9, after the hub device 430 authenticates the IoT device 420 and confirms possession of the registration information for the IoT device 420, the hub device 430 may forward the registration information to the IoT device 420. The registration information may be provided to the IoT device as a JavaScript Object Notation (JSON) object. The registration information may include the dedicated security certificate and the additional configuration data for service registration.

In step 10, the IoT device 420 may connect to the IoT service 440 (or an IoT application that is executing in the computing service environment) using the dedicated security certificate. The IoT service 440 may verify the dedicated security certificate and setup the connection with the IoT device 420. After the connection is established, the IoT device 420 may securely communicate IoT device data to the IoT service 440. The IoT device 420 may perform the IoT device data communications in accordance with a message queue telemetry transport (MQTT) protocol, which may be used as a lightweight messaging protocol for use on top of a transmission control protocol (TCP)/Internet Protocol (IP) protocol. The IoT device 420 may communicate the IoT device data directly to the IoT service 440, or alternatively, the IoT device may communicate the IoT device data to the IoT service 440 via the hub device 430.

In step 11, the IoT device 420 may communicate a confirmation message to the hub device 430 after the IoT device 420 connects to the IoT service 440. As a result, the hub device may be notified that the connection establishment was successful. In one example, the IoT device 420 may notify the hub device 430 that the connection was not successfully established.

In step 12, the hub device 430 may deactivate the registration information for the IoT device 420 after a defined period of time, which may disconnect the IoT device 420 from the IoT service 440. For example, the hub device 430 may disable the dedicated security certificate for the IoT device 420. The IoT device 420 may then attempt to reconnect to the IoT service 440, but the attempt to reconnect may cause an error. The hub device 430 may deactivate the registration for the IoT device 420 in response to receiving a status update request from the IoT device 420 (e.g., where a polling communication model is used). In response to the status update request, the hub device 430 may indicate that the IoT device 420 is to deregister from the IoT service 440 because the IoT service 440 has already deregistered the IoT device 420. The hub device 430 may later provide updated registration information (e.g., an updated security certificate) to the IoT device 420, and the IoT device 420 may perform an additional service registration request with the updated registration information. In another example, the IoT service 440 may revoke the dedicated security certificate for the IoT device 420 when a user associated with the IoT device 420 interacts with the IoT service 440, in which case the IoT device 420 may perform an additional service registration request.

In one configuration, the hub device 430 may be configured to only perform service registration for IoT devices 420. In an alternative configuration, the hub device 430 may be configured to perform various functions in addition to service registration, such as data aggregation and device state management. In this configuration, device registration is one of a plurality of functions performed by the hub device 430, which may increase productivity of the hub device 430 since the hub device 430 will not idly sit when service registration is completed.

In one configuration, the hub device 430 may be stationary, and the hub device 430 may be within a defined distance from the IoT device 420. In other words, the hub device 430 and the IoT device 420 may always be in the same local area network. In an alternative configuration, the hub device 430 may be mobile, and the hub device 430 may be moved to be within the defined distance from the IoT device 420. For example, the IoT device 420 may be within a first local area network, and the hub device 430 may be moved to be in the same local area network as the IoT device 420. After the hub device 430 completes the service registration for a first group of IoT devices (e.g., temperature sensors) in the first local area network, the hub device 430 may be moved to a second local area network to perform device registration for a second group of IoT devices (e.g., motion sensors) in the second local area network.

Figure 5:
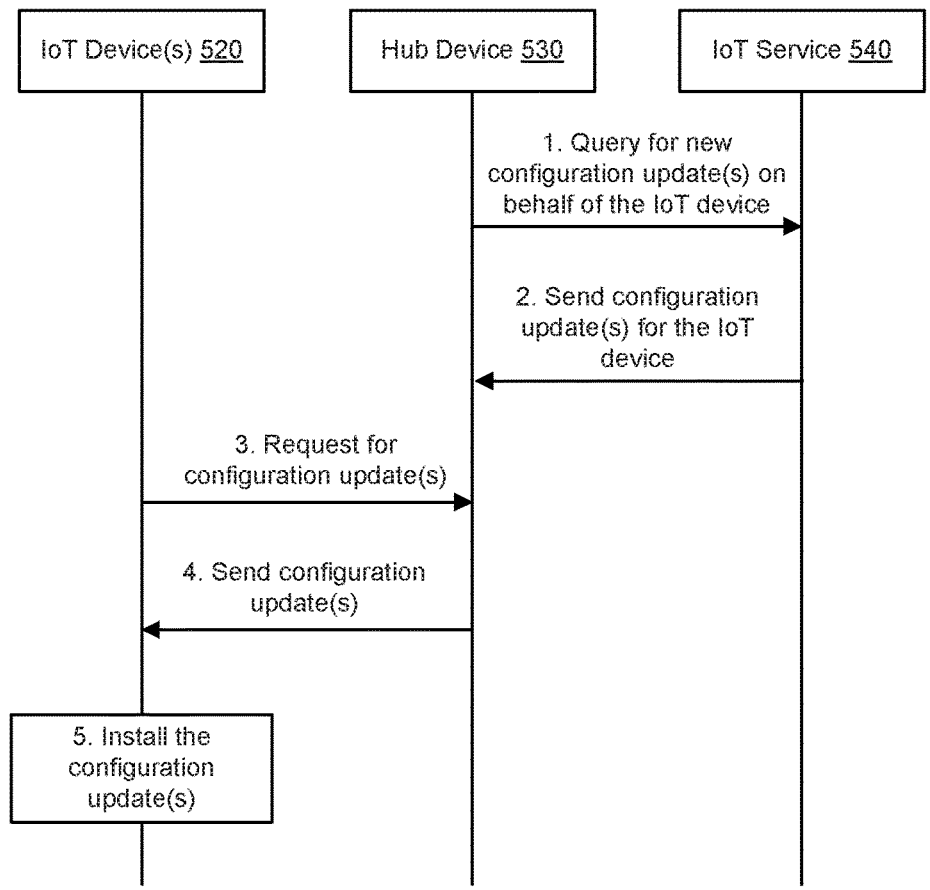
FIG. 5 illustrates operations for providing configuration updates to Internet of Things (IoT) devices via a hub device according to an example of the present technology.

FIG. 5 illustrates exemplary operations for providing configuration updates to Internet of Things (IoT) devices 520 via a hub device 530. The IoT devices 520 may be in a local area network with the hub device 530. The hub device 530 may assist in various administration tasks for the IoT devices 520, such as secure service registration for the IoT devices 520. For example, the hub device 530 may register the IoT devices 520 with an IoT service 540 (as described in FIG. 4). The IoT service 540 may operate on one or more computing instances in a computing service environment. After the service registration is completed, the IoT devices 520 may communicate IoT device data to the IoT service 540.

In one example, a series of operations may be performed to provide configuration updates or software updates to the IoT devices 520. The configuration updates may include device configuration updates or registration configuration updates. In step 1, the hub device 530 may periodically query an IoT service 540 for new configuration updates on behalf of the IoT device 520. In step 2, in response to the query, the IoT service 540 may determine that new configuration updates are available for the IoT device 520, and the IoT service 540 may send the configuration updates to the hub device 530. In an alternative configuration, the IoT service 540 may not be queried for the new configuration updates. Rather, the IoT service 540 may automatically detect that new configuration updates are available for the IoT device 520, and the IoT service 540 may send the configuration updates to the hub device 530.

In step 3, the IoT device 520 may request new configuration updates from the hub device 530. In step 4, the hub device 530 may forward the configuration updates to the IoT device 520 via a local area network connection with the IoT device 520. In step 5, the IoT device 520 may be configured to install the configuration updates and operate in accordance with the updated configuration. Therefore, rather than each IoT device 520 separately receiving the configuration updates from the IoT service 540 (which results in increased processing and signaling overhead for the networks), the configuration updates may be provided to the hub device 530, and then the hub device 530 may forward the configuration updates to the IoT devices 520 over the local area network connection.

In one example, the IoT device 520 and the hub device 530 may communicate according to a pull model. For example, the hub device 530 may not initiate communications with the IoT device 520. Rather, the hub device 530 may only respond to periodic requests from the IoT device 520. Alternatively, the IoT device 520 and the hub device 530 may communicate according to a push model. For example, the hub device 530 may send messages to the IoT device 520 irrespective of whether the IoT device 520 sends a request to the hub device 530. Similarly, communications between the IoT device 520 and the IoT service 540 may use a pull model or a push model.

Figure 6:
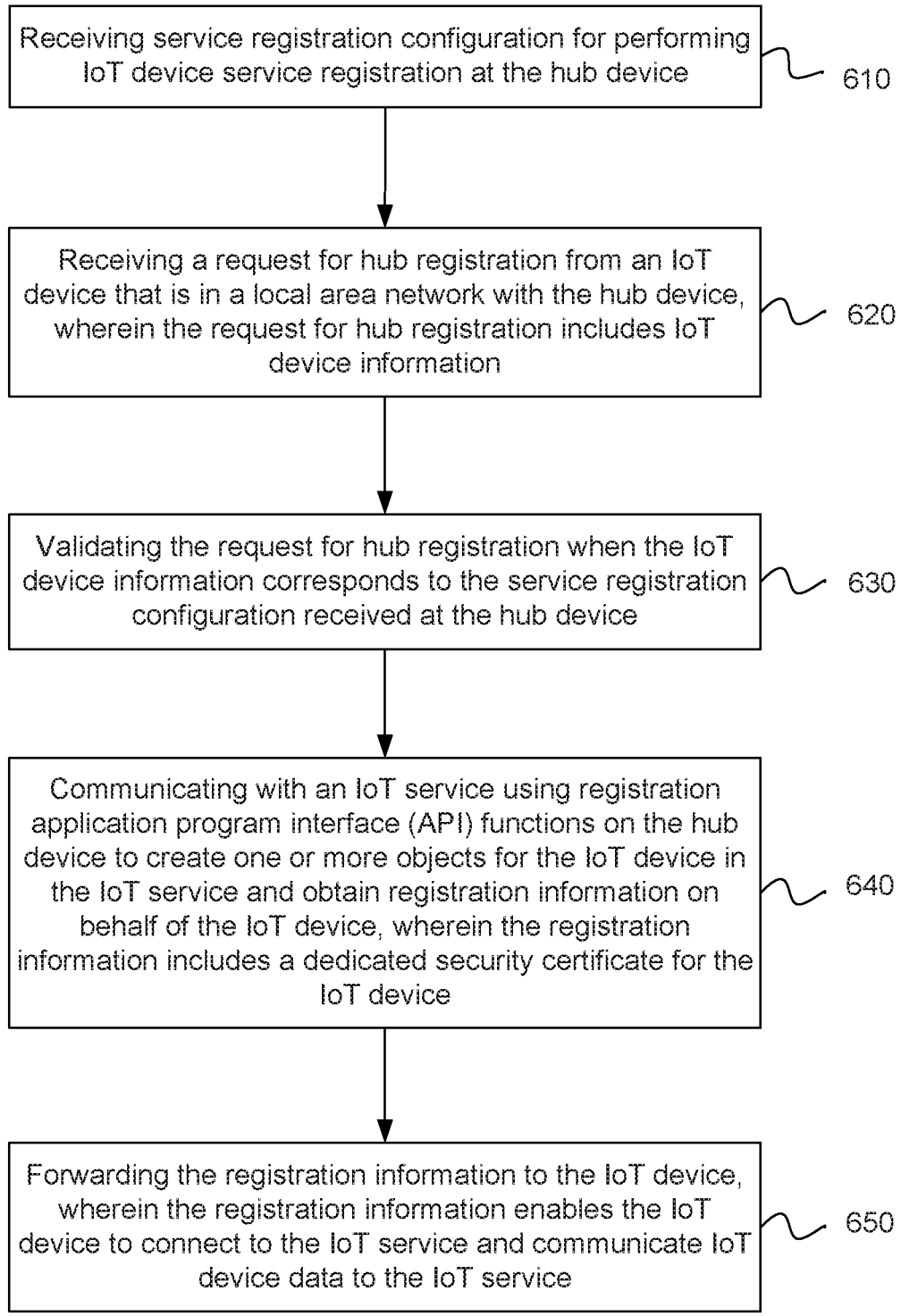
FIG. 6 is a flowchart of an example method for registering Internet of Things (IoT) devices.

FIG. 6 illustrates an example of a method for registering Internet of Things (IoT) devices. Configuration information for performing IoT device service registration may be received at a hub device, as in block 610. The hub device may receive the configuration information from a client device. The configuration information may include security credentials for the hub device to use when registering the IoT device with the IoT service, wireless access point information for the hub device to connect to the IoT service, the IoT service or application to provision for the IoT device, wireless access point information for the IoT device to connect to the IoT service, an IoT device part number and/or an IoT device serial number.

A request for hub registration may be received from an IoT device that is in a local area network with the hub device, as in block 620. The request for hub registration may include IoT device information. The IoT device information may include an IoT service or application identifier, a type of IoT device, an IoT device part number and an IoT device serial number.

The request for hub registration may be validated when the IoT device information corresponds to the configuration information received at the hub device, as in block 630. For example, the hub device may compare the configuration information received from the client device with the request for hub registration received from the IoT device, and based on the comparison, the hub device may determine that the IoT device is eligible for service registration.

The hub device may communicate with an IoT service using registration application program interface (API) functions on the hub device to create one or more objects for the IoT device in the IoT service and obtain registration information on behalf of the IoT device, as in block 640. The registration information may include a dedicated security certificate for the IoT device. As an example, the dedicated security certificate may be an X.509 certificate.

The registration information may be forwarded to the IoT device, as in block 650. The registration information (e.g., dedicated security certificate) may enable the IoT device to connect to the IoT service and communicate IoT device data to the IoT service. The IoT device may communicate the IoT device data directly to the IoT service or via the hub device.

In one example, a connection may be established between the hub device and the IoT device. The connection may be initiated by the IoT device using hub connection information that is preconfigured at the IoT device. The hub connection information may include: a service set identifier (SSID) associated with the hub device; and instructions to connect to the hub device after the IoT device is powered on.

In one example, a security token may be provided from the hub device to the IoT device after the request for hub registration is validated at the hub device. A request for service registration may be received from the IoT device. The request for service registration may include the security token communicated from the hub device to the IoT device. The hub device may determine that the registration information for the IoT device is successfully received from the IoT service. The security token included in the request for service registration may be authenticated at the hub device prior to forwarding the registration information from the hub device to the IoT device.

In one example, the hub device may receive a configuration update or software update from the IoT service, and the configuration update may be for the IoT device. The hub device may provide the configuration update to the IoT device. The IoT device may be configured to install the configuration update.

Figure 7:
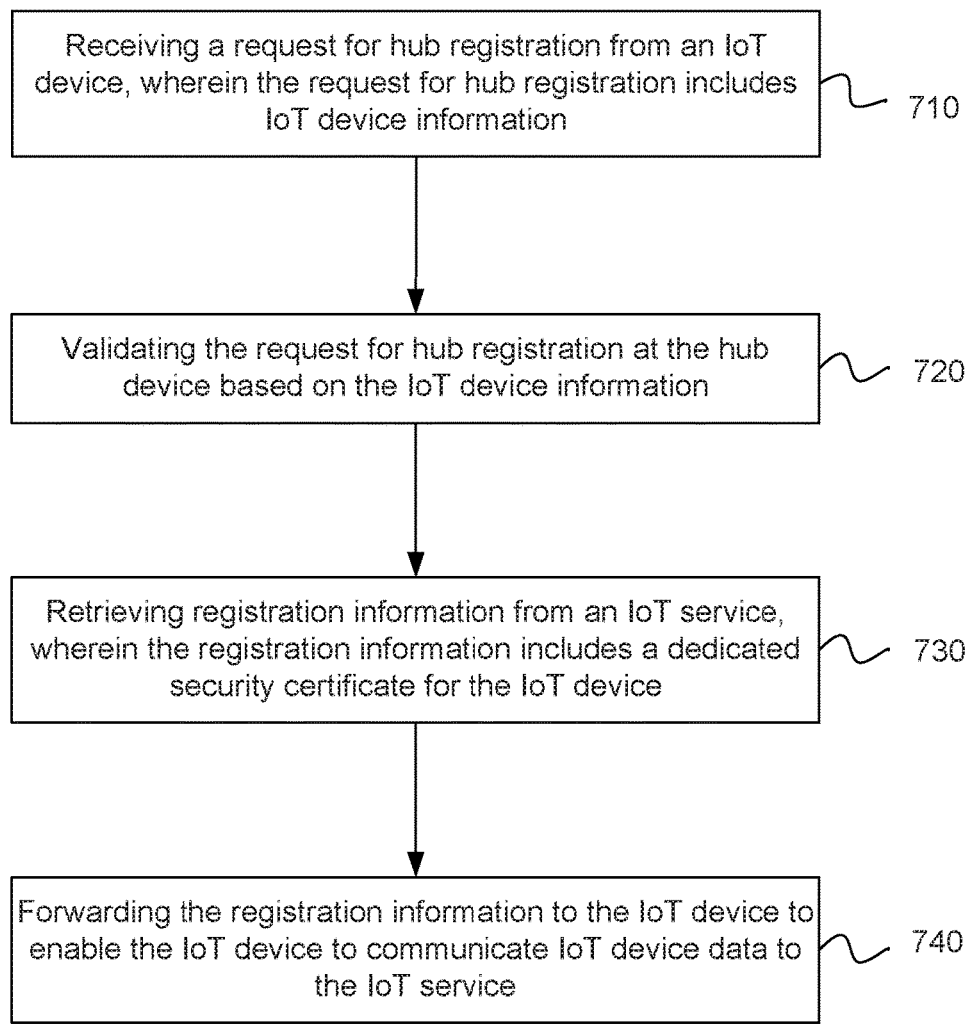
FIG. 7 is a flowchart of another example method for registering Internet of Things (IoT) devices.

FIG. 7 illustrates an example of a method for registering Internet of Things (IoT) devices. A request for hub registration may be received from an IoT device, as in block 710. The request for hub registration received from the IoT device may be a RESTful application program interface (API) request, such as a hypertext transfer protocol (HTTP) POST request. In addition, the request for hub registration may include IoT device information. For example, the IoT device information may include an IoT service or application identifier, a type of IoT device, an IoT device part number and/or an IoT device serial number.

The request for hub registration may be validated at the hub device based on the IoT device information, as in block 720. The request for hub registration may be validated based on a comparison between the IoT device information and configuration information for performing IoT device service registration at the hub device.

Registration information may be retrieved from an IoT service, as in block 730. The registration information may include a dedicated security certificate for the IoT device. As an example, the dedicated security certificate may be an X.509 certificate.

The registration information may be forwarded to the IoT device to enable the IoT device to communicate IoT device data to the IoT service, as in block 740. The registration information may enable the IoT device to connect to the IoT service and communicate the IoT device data directly to the IoT service or via the hub device.

In one example, configuration information for performing IoT device service registration may be received at the hub device. The configuration information may be received from a client device. The configuration information may include security credentials for the hub device to use when registering the IoT device with the IoT service, wireless access point information for the hub device to connect to the IoT service, the IoT service or application to provision for the IoT device, wireless access point information for the IoT device to connect to the IoT service, an IoT device part number and/or an IoT device serial number.

In one example, a security token may be provided from the hub device to the IoT device after the request for hub registration is validated. A request for service registration may be received at the hub device from the IoT device. The request for service registration may be a RESTful API request, such as a hypertext transfer protocol (HTTP) GET request, that includes the security token communicated from the hub device to the IoT device. The security token included in the request for service registration may be authenticated prior to forwarding the registration information from the hub device to the IoT device.

In one example, the hub device may be stationary and within a defined distance from the IoT device. In another example, the hub device may be mobile, and the hub device may be moved to be within the defined distance from the IoT device.

In one example, the hub device may receive a configuration update or software update from the IoT service, and the configuration update may be for the IoT device. The hub device may provide the configuration update to the IoT device. The IoT device may be configured to install the configuration update.

In one example, data aggregation and device state management may be performed at the hub device for the IoT device. In another example, the registration information may be deactivated for the IoT device. The deactivation of the registration information may disconnect the IoT device from the IoT service, and the IoT device may perform an additional service registration request with updated registration information. In yet another example, the hub device may detect that the IoT device is successfully connected to the IoT service based on a confirmation message transmitted from the IoT device to the hub device.

Figure 8:
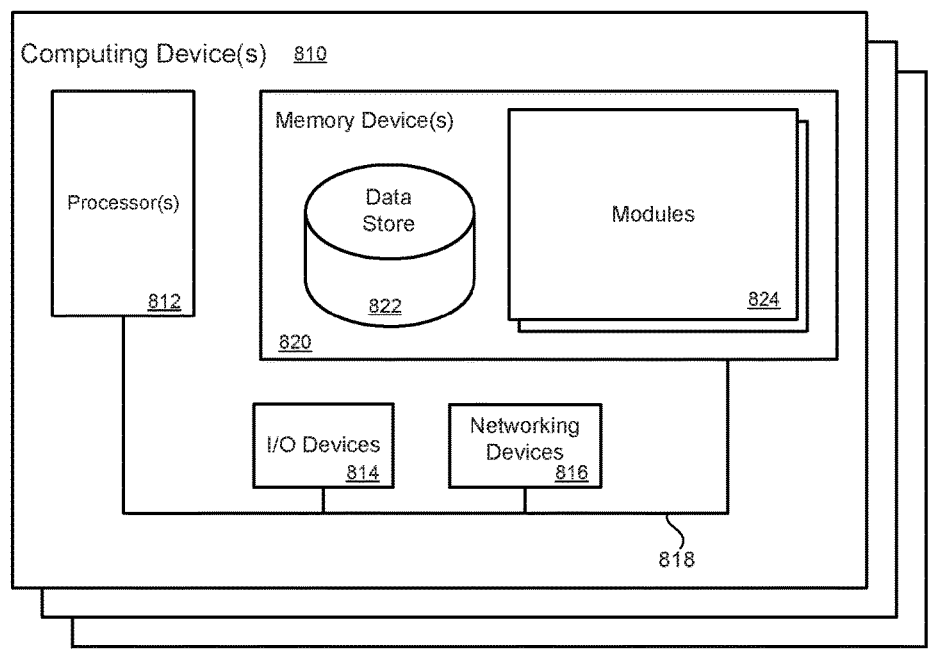
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for registering Internet of Things (IoT) devices, the method comprising:
    receiving, using one or more processors of a hub device, a service registration configuration from a client device for performing IoT device service registration at the hub device;
    receiving, using the one or more processors of the hub device, a request for hub registration from an IoT device that is in a local area network with the hub device, wherein the request for hub registration includes IoT device information;
    validating, using the one or more processors of the hub device, the request for hub registration when the IoT device information corresponds to the service registration configuration received at the hub device;
    communicating with an IoT service using registration application program interface (API) functions on the hub device to obtain registration information on behalf of the IoT device from the IoT service, wherein the registration information includes a dedicated security certificate for the IoT device; and
    forwarding, using the one or more processors of the hub device, the registration information from the hub device to the IoT device, wherein the registration information enables the IoT device to connect to the IoT service and communicate IoT device data to the IoT service.

2. The method of claim 1, further comprising establishing a connection between the hub device and the IoT device, wherein the connection is initiated by the IoT device using hub connection information that is preconfigured at the IoT device, and the hub connection information includes: a service set identifier (SSID) associated with the hub device, and instructions to connect to the hub device after the IoT device is powered on.

3. The method of claim 1, further comprising:
    providing a security token from the hub device to the IoT device after the request for hub registration is validated at the hub device;
    receiving a request for service registration from the IoT device, wherein the request for service registration includes the security token communicated from the hub device to the IoT device;
    determining, at the device hub, that the registration information for the IoT device is successfully received from the IoT service; and
    authenticating the security token included in the request for service registration at the hub device prior to forwarding the registration information from the hub device to the IoT device.

4. The method of claim 1, further comprising:
    receiving, at the hub device, a configuration update from the IoT service, wherein the configuration update is for the IoT device; and
    providing the configuration update to the IoT device, and the IoT device is configured to install the configuration update.

5. A method, comprising:
    receiving, using one or more processors of a hub device, a request for hub registration from an IoT device, wherein the request for hub registration includes IoT device information;
    validating, using the one or more processors of the hub device, the request for hub registration at the hub device based on the IoT device information included in the request;
    obtaining, using the one or more processors of the hub device, registration information from an IoT service, wherein the registration information includes a dedicated security certificate for the IoT device; and
    forwarding the registration information retrieved from the IoT service to the IoT device to enable the IoT device to connect to the IoT service.

6. The method of claim 5, wherein the registration information enables the IoT device to connect to the IoT service and communicate the IoT device data directly to the IoT service or via the hub device.

7. The method of claim 5, further comprising receiving a service registration configuration for performing IoT device service registration at the hub device, wherein the service registration configuration includes at least one of: security credentials for the hub device to use when registering the IoT device with the IoT service, wireless access point information for the hub device to connect to the IoT service, the IoT service or application to provision for the IoT device, wireless access point information for the IoT device to connect to the IoT service, an IoT device part number and an IoT device serial number.

8. The method of claim 5, wherein the IoT device information in the request for hub registration includes at least one of: an IoT service or application identifier, a type of IoT device, an IoT device part number and an IoT device serial number.

9. The method of claim 5, further comprising:
    providing a security token from the hub device to the IoT device after the request for hub registration is validated;
    receiving a request for service registration at the hub device from the IoT device, wherein the request for service registration is a RESTful application program interface (API) request that includes the security token communicated from the hub device to the IoT device; and
    authenticating the security token included in the request for service registration prior to forwarding the registration information from the hub device to the IoT device.

10. The method of claim 5, further comprising: validating the request for hub registration based on a comparison between the IoT device information and a service registration configuration for performing IoT device service registration at the hub device.

11. The method of claim 5, wherein the request for hub registration received from the IoT device is a RESTful application program interface (API) request.

12. The method of claim 5, wherein the dedicated security certificate is an X.509 certificate.

13. The method of claim 5, wherein the hub device is stationary and within a defined distance from the IoT device.

14. The method of claim 5, wherein the hub device is mobile and is moved to be within the defined distance from the IoT device.

15. The method of claim 5, further comprising: performing data aggregation and device state management at the hub device for the IoT device.

16. The method of claim 5, further comprising deactivating the registration information for the IoT device, wherein deactivation of the registration information disconnects the IoT device from the IoT service and the IoT device performs an additional service registration request with updated registration information.

17. The method of claim 5, further comprising: detecting that the IoT device is successfully connected to the IoT service based on a confirmation message transmitted from the IoT device to the hub device.

18. A system for registering Internet of Things (IoT) devices, the system comprising:
   a processor;
   a memory device including a data store to store a plurality of data and instructions that, when executed by the processor, cause the processor to:
   receive a service registration configuration for performing IoT device service registration at a hub device;
   receive a request for hub registration from an IoT device that is in a local area network with the hub device, wherein the request for hub registration includes IoT device information;
   validate the request for hub registration when the IoT device information corresponds to the service registration configuration received at the hub device;
   communicate with an IoT service using registration application program interface (API) functions on the hub device to retrieve registration information on behalf of the IoT device from the IoT service, wherein the registration information includes a security certificate for the IoT device; and
   forward the registration information from the hub device to the IoT device, wherein the registration information enables the IoT device to connect to the IoT service and communicate IoT device data to the IoT service.

19. The system of claim 18, wherein the plurality of data and instructions, when executed by the processor, cause the processor to:
   provide a security token from the hub device to the IoT device after the request for hub registration is validated at the hub device;
   receive a request for service registration from the IoT device, wherein the request for service registration includes the security token communicated from the hub device to the IoT device;
   determine that the registration information for the IoT device is successfully received from the IoT service; and
   authenticate the security token included in the request for service registration at the hub device prior to forwarding the registration information from the hub device to the IoT device.

20. The system of claim 18, wherein the plurality of data and instructions, when executed by the processor, cause the processor to:
   receive a configuration update from the IoT service, wherein the configuration update is for the IoT device; and
   provide the configuration update to the IoT device, and the IoT device is configured to install the configuration update.

* * * * *